United States Patent
Iseli et al.

(10) Patent No.: US 11,585,650 B2
(45) Date of Patent: Feb. 21, 2023

(54) DYNAMICAL MODELING OF CMMS FOR NUMERICALLY CORRECTING MEASUREMENT RESULTS

(71) Applicant: HEXAGON TECHNOLOGY CENTER GMBH, Heerbrugg (CH)

(72) Inventors: Claudio Iseli, AU (CH); Silvan Meile, St. Gallen (CH); Paolo Mastrapasqua, St. Gallen (CH); Bernhard Sprenger, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 70 days.

(21) Appl. No.: 17/113,183

(22) Filed: Dec. 7, 2020

(65) Prior Publication Data
US 2021/0190475 A1   Jun. 24, 2021

(30) Foreign Application Priority Data
Dec. 20, 2019   (EP) .................................... 19218988

(51) Int. Cl.
*G01B 9/02055*   (2022.01)
*G06F 30/20*   (2020.01)
*G01B 11/00*   (2006.01)
*G06F 111/10*   (2020.01)

(52) U.S. Cl.
CPC ........ *G01B 9/02072* (2013.04); *G01B 11/005* (2013.01); *G06F 30/20* (2020.01); *G06F 2111/10* (2020.01)

(58) Field of Classification Search
CPC .... G01B 21/04; G01B 21/042; G01B 21/045; G01B 5/008; G01B 11/005; G01B 9/02072; G06F 30/20; G06F 2111/10
See application file for complete search history.

(56) References Cited

U.S. PATENT DOCUMENTS

| | | |
|---|---|---|
| 9,212,888 B2 | 12/2015 | Merlo |
| 2018/0328705 A1* | 11/2018 | Sprenger ............ G01D 5/34746 |

FOREIGN PATENT DOCUMENTS

| | | | |
|---|---|---|---|
| DE | 10 2014 214365 A1 | | 7/2015 |
| DE | 102014214365 | * | 7/2015 |
| EP | 0684448 B1 | | 3/2004 |
| GB | 2520711 | * | 3/2015 |

OTHER PUBLICATIONS

European Search Report issued in corresponding application No. 19 21 8988, dated Jul. 13, 2020.

* cited by examiner

*Primary Examiner* — Catherine T. Rastovski
(74) *Attorney, Agent, or Firm* — Maschoff Brennan (57) ABSTRACT

A computer program product for numerically correcting an endpoint position of a Coordinate Measuring Machine (CMM) implemented on a computing unit, receiving as input temporally resolved information from a set of sensors attached to or integrated into the CMM, and to a method for numerically correcting an endpoint position of a CMM, wherein errors between a targeted endpoint position and an actual endpoint position reached during a measurement process are numerically compensated through the use of the computer program product.

15 Claims, 4 Drawing Sheets

DYNAMICAL MODELING OF CMMS FOR NUMERICALLY CORRECTING MEASUREMENT RESULTS

CROSS-REFERENCE TO RELATED APPLICATIONS

This application claims priority to European Patent Application No. 19218988.4, filed on Dec. 20, 2019. The foregoing patent application are incorporated herein by reference.

FIELD OF THE INVENTION

The present invention relates to a dynamical model of a Coordinate Measuring Machine (CMM) used for numerically correcting measurement results provided by the CMM.

BACKGROUND

In many different technical fields, it is desired to measure objects precisely, or to acquire further information about their internal composition. This applies in particular to the manufacturing industry which requires precise measuring and inspection processes in order to control the quality of its products. A common device used for such metrological purpose is a Coordinate Measuring Machine.

A common method to calibrate a Coordinate Measuring Machine is to condense the individual mechanical compliances of the component parts of the CMM, the component parts ordered along a kinematical chain, into the probe-deflection-matrix. The probe-deflection-matrix is estimated by scanning a known calibration artifact in a controlled manner by pre-setting the scanning speed and other parameters controlling the scan at the specific scanning point. A correction vector is then obtained which compensates all mechanical compliances at the specific scanning point for the chosen scan settings. In case the specific scanning point or the scan settings are changed, a new probe-deflection-matrix needs to be estimated.

To compensate mechanical compliances in the entire possible measurement volume for different scan settings at once, specifically through a single calibration procedure, black-box-models were previously disclosed. A model is learned from measurements alone, wherein the learned model does not utilize a priori information. EP0684448B1 discloses such a black-box-method for calibrating a CMM. Such methods in general require many calibration steps. A change in the CMM additionally requires a repetition of the calibration procedure.

BRIEF DESCRIPTION OF THE INVENTION

It is therefore an objective of some aspects of the present invention to provide a compensation method for a CMM in the entire measurement volume, wherein the compensation method requires a reduced number of calibration steps.

This objective is achieved by realizing at least part of the features of the independent claims. Features which further develop the invention in an alternative or advantageous manner are described in the dependent patent claims.

Some aspects of the invention relates to a computer program product for numerically correcting an endpoint position of a Coordinate Measuring Machine (CMM) implemented on a computing unit, receiving as input temporally resolved information from a set of sensors attached to or integrated into the CMM, temporally resolved information about component parts physically constituting the CMM as well as their mechanical properties, a set of possible models, each with a potentially different set of free parameters, for modelling the constituting component parts of the CMM, a set of possible models, each with a potentially different set of free parameters, for fusing the constituting component models into a model for the whole CMM, and calibration information for adapting the free parameters of the constituting component models and the fusion models from some initially known nominal values of the free parameters, wherein a simulation of the behavior of the CMM is carried out, which simulation is based on the temporally resolved information from the sensors attached to the CMM and the temporally resolved knowledge of the physical components constituting the CMM as well as their mechanical properties, and wherein the physical modelling of the CMM required for the simulation is time-adaptive, insofar as the models for the constituting component parts of the CMM and the fusion models at any specific simulation time, a corresponding unique physical time existing for each simulation time, are adapted to the temporal history of the sensor readings and the temporal history of the constituting component parts before the uniquely corresponding physical time corresponding to the specific simulation time, and wherein for each adaptation of either a constituting component model or a fusion model the provided calibration information is used for adapting the free parameters of the adapted models, and the results of the simulation are used for numerically correcting a measurement obtained by the CMM for which the simulation is carried out, insofar as the simulated position of the endpoint of the CMM at the time at which the measurement was obtained by the CMM is used to numerically correct the measurement, wherein the endpoint position comprises in particular information about the spatial position and/or orientation of the endpoint of the CMM.

The term set is used in the mathematical sense. A set can therefore comprise no element, one element or a plurality of elements. The term free parameter is understood to refer to those parameters of a mathematical model which need to be determined through a calibration procedure. The endpoint position of a CMM refers to a point in the probing system of the CMM, wherein a probe tip is an exemplary endpoint in case of a tactile probing system. In case of an optical probing system, the endpoint would correspond to the last spatially extended sub-component of the probing system. Information regarding the endpoint position provided by the simulation may comprise both information regarding a position in 3D space as well as information about the orientation of the endpoint. In this case, six values may be provided by the computer program product. The models used may furthermore be physically realistic.

In one embodiment of the computer program product, the models of the constituent component parts and the fusion models, both adapted in a time-resolved fashion, are chosen in such a way as to be able to model the expected and relevant deformations which the CMM experiences during a measurement process, the measurement process being simulated through the use of said models.

In another embodiment of the computer program product, the simulation of the CMM proceeds in a two-step fashion, a first step being a multibody simulation, for which it is assumed that the constituting components of the CMM are either rigid bodies or elastic bodies, used for obtaining time-resolved forces and moments acting on the constituting components of the CMM, the calculated time-resolved forces and moments being used in a second step for simulating possible deformations of the constituting components of the CMM.

In another embodiment of the computer program product, a constituting component of the CMM modelled as an elastic body is either modelled by a set of symbolic equations or by a numerical method, in particular by a finite element method, while the chosen resolution of the numerical method and the linked number of node parameters are determined by the expected extent of the spatial deformations of the component during a measurement process as well as the expected temporal frequencies of such deformations, so that different constituting components of the CMM can be modelled in particular by numerical methods with different resolutions.

The term symbolic equation is understood to refer an equation which can be directly solved for a desired variable, the solution of the symbolic equation hence not requiring an inherently necessary discretization in space or time. An example is Hooke's law linking the deformation of a spring to the force applied on the spring. If the estimation of deformation due to an applied force required a numerical technique such as finite element methods on the other hand, the estimation of the deformation would not proceed by solving a symbolic equation.

In another embodiment of the computer program product, the simulation of the CMM is carried out using only a subset of the constituting components of the CMM, particularly a subset of the constituting components that are deemed relevant for the simulation of the CMM.

Not all component parts of the CMM need to be simulated in general. The table of a CMM may—in certain cases—be considered as rigid and unmoving during a measurement process. The table may, however, be also included in the simulation, in particular if it provides active dampening.

In another embodiment of the computer program product, calibration information is provided in modular form to the computer program product, insofar as separate calibration steps are carried out for subsets of constituting components of the CMM, the separate calibration steps matched in complexity to the number of free parameters parametrizing the overall subset models describing the subsets to be calibrated, and the overall CMM is calibrated by combining these separate calibration steps.

In another embodiment of the computer program product, upon a change of a constituting component of the CMM, only those subsets comprising the changed constituting component are recalibrated, wherein the free parameters of the remaining subset models are left unchanged.

In another embodiment of the computer program product, upon a change in a probing system of the CMM, only the sub-structures of the probing system affected by the change are recalibrated, and the models describing the remaining constituting components of the CMM and the fusion models linking the remaining constituting component models are adapted to take into account the known properties of said changed probing system, wherein a known property of said probing system is its mass in particular.

In another embodiment of the computer program product, the computational complexity of the simulation algorithm is given by at most $O(n+m^3)$, with n denoting the number of those constituting components of the CMM which are used in the simulation, and m denoting the greatest number of node points used in the numerical estimation of deformations of the constituting part model of any such constituting component, wherein the big O notation used fixes the asymptotic growth behavior of the computer program product.

In another embodiment of the computer program product, a change in a constituting component of the CMM is automatically incorporated into the computer program product, in particular by equipping each constituting component of the CMM with a unique identifier device so that upon the replacement of a constituting component with a different constituting component the unique identifier of the different constituting component is automatically transmitted to the computer program product which then updates the overall CMM model accordingly.

In another embodiment of the computer program product, the underlying physical measurement process of the CMM on which the simulation is based provides only one-way information to the computer program product, wherein the results of the simulation are only used for a numerical compensation of CMM measurement errors.

The computer program product may therefore provide only information for numerically compensating the obtained measurement results and may not influence the measurement process itself. Alternatively, it could be envisioned to use the computer program product actively, wherein the measurement process of the CMM is to be adapted to obtain a desired measurement trajectory of the CMM.

In another embodiment of the computer program product, the sensor readings used by the computer program product capture information about the state of the CMM, in particular drive axes acceleration information, probe forces, local mass changes of the CMM inducing gravitational changes and information from the bearings of the CMM.

The information provided by the sensors may contain necessary information to simulate the dynamical behavior of the CMM.

Some aspects of the invention relate to a method for numerically correcting an endpoint position of a CMM, wherein errors between a targeted endpoint position and an actual endpoint position reached during a measurement process are numerically compensated through the use of the computer program product.

In one embodiment of the method, error compensation values are either computed in real time in parallel to a measurement process of the CMM, or, if measurement trajectories are known, before a measurement process of the CMM, so that error compensation maps can be stored on the computing unit for a set of fixed known CMM trajectories, subsequently being used during a measurement process for which error compensation values have been precomputed.

Stored error compensation maps can be used to pre-adapt a measurement trajectory in such a way as to reach a desired trajectory. Error compensation maps may therefore be computed for specific programmed trajectories and do not need to be recomputed during the execution of a programmed trajectory. Error compensation values may also be computed in parallel to the execution of a measurement trajectory, using nominal values used for controlling the CMM. Alternatively, error compensation values may also be computed in parallel to the execution of a measurement trajectory using information provided by sensors. The possible measurement volume of the CMM may also be subdivided by a grid, and error compensation values may be pre-computed on the grid. For points outside of the grid, error compensation values may then be interpolated during the execution of a trajectory. The grid may also be specifically covering a tube containing the geometrical path of a trajectory. Besides being pre-specified, a grid covering a tube containing the geometrical path of a trajectory may also be adapted based on the past history of the trajectory, so that different evolutions of the trajectory can dynamically change the resolution of the grid, for example.

In another embodiment of the method, a calibration step density is bounded from above by at most 4-6, wherein the calibration step density is defined by the ratio of the measurement volume of the CMM in cubic meters to the number of calibration steps performed, wherein a calibration step is considered to be a measurement process which fixes unknown degrees of freedom of the overall CMM model, or from the modular structure of the overall CMM model it follows that the number of calibration steps required depends primarily on the number of degrees of freedom of the constituting component models of the constituting components used in the simulation, wherein a calibration step is considered to be a measurement process applied at specific system states, wherein a system state is described by small position ranges of active axes as well as length and orientation of probe/stylus in the case of a tactile probe.

The upper bound on the calibration step density can limit the complexity of the CMM. A smaller required calibration step density may indicate a simper overall device.

BRIEF DESCRIPTION OF THE DRAWINGS

The inventive system is described below in more detail purely by way of example with the aid of concrete exemplary embodiments illustrated schematically in the drawings, further advantages of the invention also being examined. Identical elements are labelled with the same reference numerals in the figures. In detail:

FIGS. 4a and 4b show abstract representations of modular calibration according to the invention, wherein FIG. 4a represents the schematics of the physical components and FIG. 4b represents the simulation model of the CMM;

DETAILED DESCRIPTION

In the following detailed description of the Figures, reference is made to CMMs. The invention, however, applies to more general measuring instruments as well. Any measuring instrument can in principle be simulated, the simulation of the measuring instrument constrained by sensor outputs obtained from the actual measurement performed by the measuring instrument. The precise physical simulation of the dynamical behavior of the measuring instrument can then be used for numerically correcting the actually made measurements.

Figure 1:
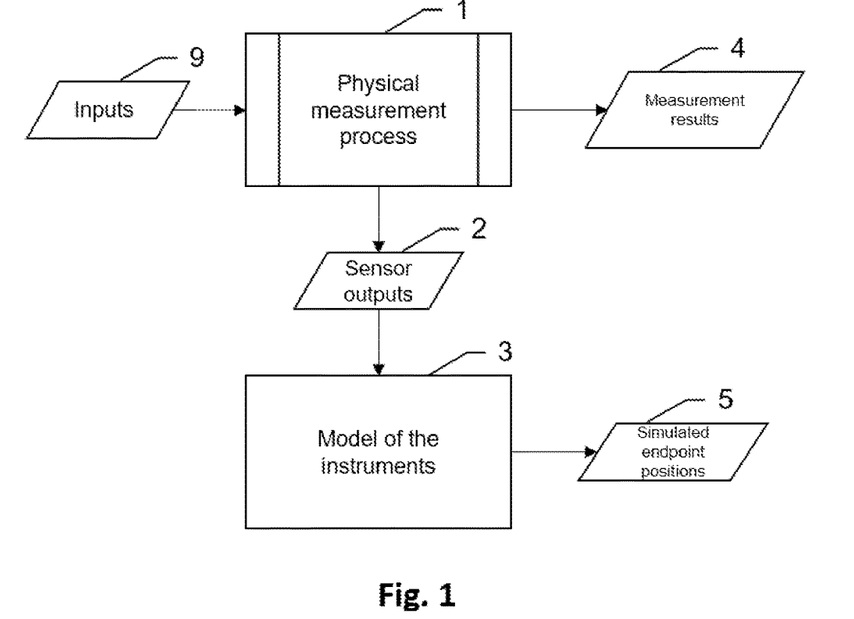
FIG. 1 shows a schematic illustration of the method according to the invention for numerically correcting the position of an endpoint of a Coordinate Measuring Machine (CMM)

FIG. 1 shows a schematic and abstract representation of the method according to the invention for numerically correcting an endpoint position of a CMM. A possible endpoint position is a probe tip for the case of a tactile probing system. The actual physical measurement process 1 carried out by the CMM produces measurement results 4 of the endpoint position when applied to a work piece. The measurement process 1 is controlled by inputs 9 obtained from a computing unit configured to control the CMM. Due to nonidealities of the CMM, the measurement results 4 obtained from applying the CMM to a work piece in general do not provide true measurement results. One possible source of nonidealities in the measurement process are deformations of CMM components due to forces arising from accelerations. Besides deformations, accelerations of the components of the CMM can in general also result in the presence of vibrations. One possible way to mitigate such unwanted effects is to improve the CMM design. In FIG. 1, a different solution according to the invention is schematically shown. Sensors attached to or integrated into the CMM provide sensor outputs 2 which capture the time-resolved behavior of the CMM during the measurement process 1. The sensors are configured to provide information necessary to identify the dynamical behavior of the CMM, in particular drive axes acceleration information, probe forces, local mass changes of the CMM and information from the bearings of the CMM. The time-resolved sensor outputs 2 are used for simulating the behavior of the CMM through a model 3 of the CMM.

The model 3 of the CMM used is configured to mimic physical reality closely. The model 3 of the CMM is therefore set up to reflect the physical configuration of the CMM used for the measurement process 1. The model 3 of the CMM can in general be time-adaptive, wherein the model 3 of the CMM at any specific simulation time can depend both on the current and previous physical configuration of the CMM and on the current and previous sensor outputs 2 provided to the model 3. Large accelerations of the component parts 6 of the CMM before a specific simulation time can for example lead to high-frequency vibrations of the endpoint of the CMM. Given such large accelerations in the past, the resolution of the model 3 of the CMM could be increased both in time and space to capture such high-frequency vibrations in the model. Overall, the model 3 of the CMM provides simulated endpoint positions 5. In case the modeling 3 of the CMM reflects reality closely, the simulated endpoint positions 5 can be used for obtaining the true positions at which measurements were made by the CMM. The measurement results 4 of the CMM can therefore be numerically corrected by way of using the simulated endpoint positions 5.

Figure 2:
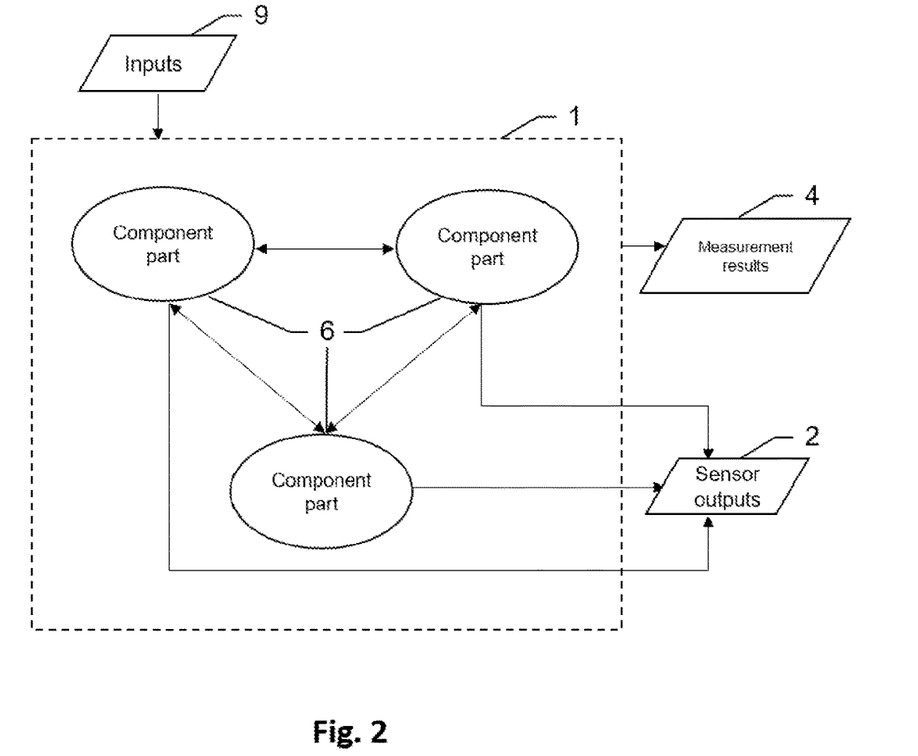
FIG. 2 shows a more detailed schematic and abstract illustration of the CMM whose measurement results are numerically corrected through a simulation of the CMM.

FIG. 2 shows a more detailed schematic and abstract representation of the modular nature of the physical configuration of the CMM used for carrying out the measurement process 1. The CMM can comprise different component parts 6 which are linked to one another. In FIG. 2, three component parts 6 are shown schematically and all three components parts 6 are linked to one another. The specific number of components parts 6 as well as their interconnections as shown in FIG. 2 are completely arbitrary and are only used for illustrative purposes. The number of component parts 6 reflect the physical configuration of the CMM and will for example be determined by component parts such as a probe head, a z-ram, a table etc. The actual CMM could in principle comprise any number of distinct component parts 6, and not all component parts 6 are in general physically connected to all other component parts 6. The endpoint positions 4 provided by the measurement process 1 correspond to a measured surface of a work piece, wherein the CMM used for measuring the work piece is controlled through control inputs 9. Sensors are attached to or integrated into the CMM, the sensors configured to capture time-resolved information 2 about the dynamical state of the CMM obtained during a measurement process 1.

Figure 3:
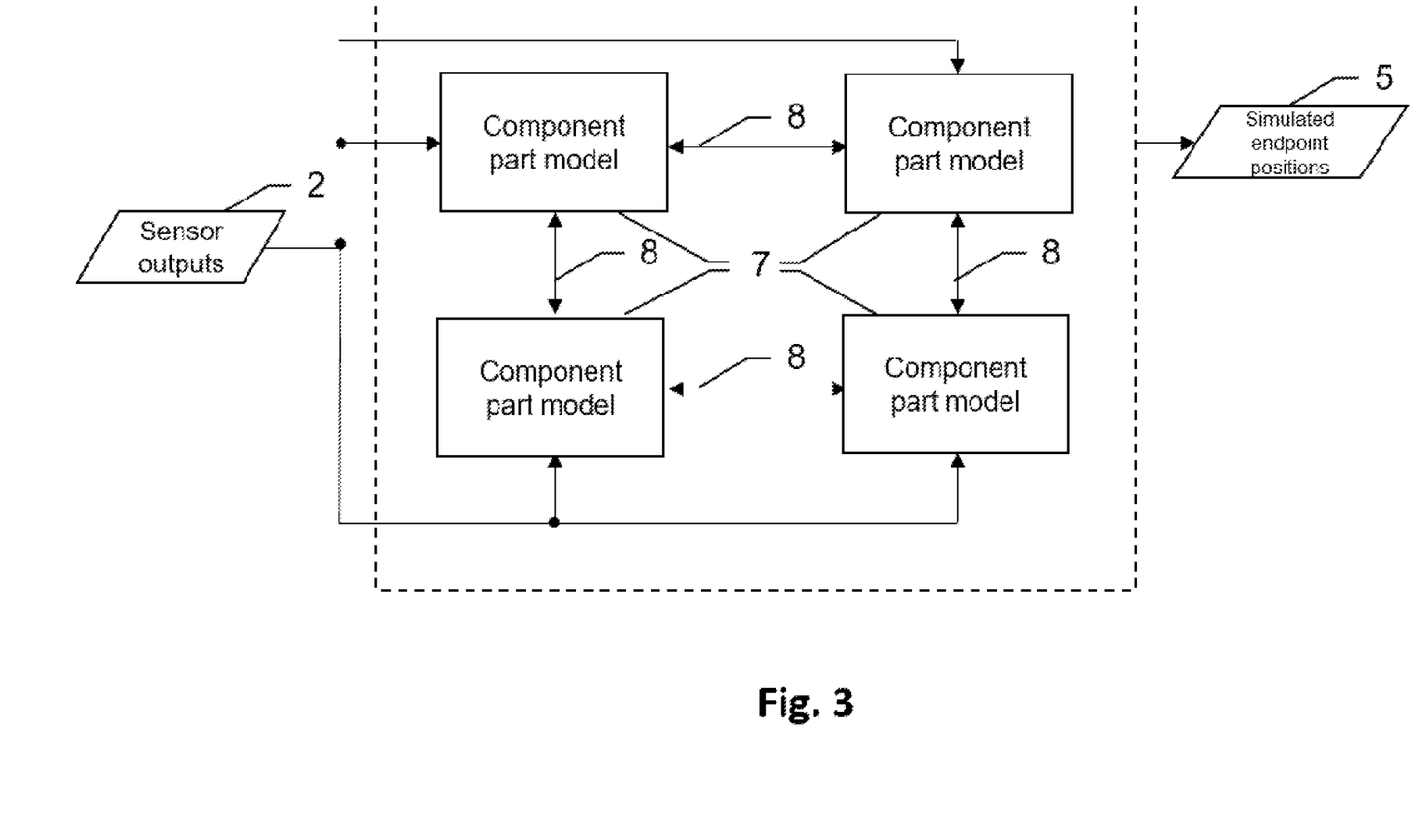
FIG. 3 shows a more detailed schematic and abstract illustration of the model used for simulating the dynamical behavior of the CMM according to the invention.

FIG. 3 shows a schematic and abstract representation of a model 3 used for simulating the dynamical behavior of the CMM on a computing unit. The model 3 used for simulating the CMM is configured to mimic the physical configuration of the CMM as shown in FIG. 2. The physical component parts 6 are represented by component part models 7. The number of component part models 7 does not need to be equal to the number of component parts 6. In FIG. 3, for example, the single lower component part from FIG. 2 is represented by two component part models 7. The component part models 7 are linked to one another by fusion models 8. In principle, one model 7 could be sufficient for simulating the dynamical behavior of the CMM. The differential equations governing the CMM behavior could for example be simulated through the use of finite element methods on a computing unit. Using one large finite element simulation for the entire CMM, however, leads to a large overall computation time to simulate the CMM behavior. It is therefore advisable to split the overall model into component part models 7 and to link the component part models 7 with fusion models 8 such as spring-damper-coupling elements. The dynamical behavior of the CMM can then be simulated through a two-step approach, wherein a multibody simulation is first carried out, the multibody simulation assuming that the component parts 6 are rigid or elastic bodies and the multibody simulation providing forces and moments acting on the component parts 6. The forces and moments acting on the component parts 6 as obtained through a multibody simulation can then be used to calculate elastic deformations, for example, in a second step. To obtain deformations, for example, finite element methods can be used.

The overall computational complexity of such a two-step simulation of the overall dynamical behavior of the CMM is primarily determined by the number of component part models 7 and the largest number of nodes used for numerically modeling any individual component part model, in case numerical methods are used for calculating deformations, for example. In case the elastic behavior of a component part 6 is known and describable through the use of a closed-form equation that can be solved directly for the deformation, the closed-form equation can be used as the corresponding component part model 7. If all component part models 7 were given by closed-form equations, the overall computational complexity of the CMM simulation would be primarily determined by the multibody simulation, wherein the computational complexity of the multibody simulation scales linearly in the number of component part models 7.

The component part models 7 used in the simulation of the dynamical behavior of the CMM are provided with the time-resolved sensor outputs 2 obtained during the actual measurement process 1. The overall model 3 therefore takes into account the dynamics of the CMM during a specific measurement process 1.

The free parameters of the component part models 7 such as their respective masses etc. in general need to be determined through separate calibration steps. The calibration steps are carried out on known artifacts.

To reduce the computational complexity of the CMM simulation, the CMM could also be designed in such a way so that it could be accurately modeled by a simple set of equations that can be efficiently solved on a computing unit. Such a design intended to lead to computational simplicity could be additionally coupled to reduction techniques such as Guyan reduction or other reduction techniques to further reduce computational requirements.

Figure 4A:
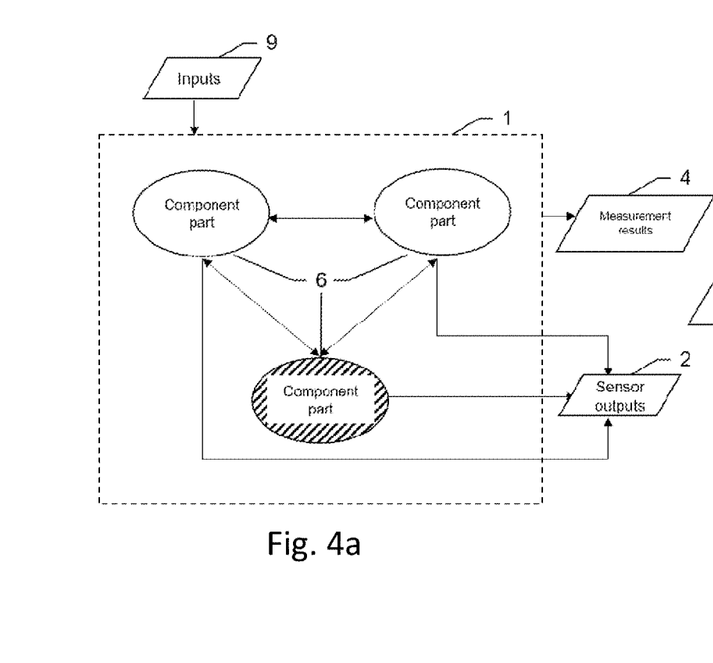
Figure 4B:
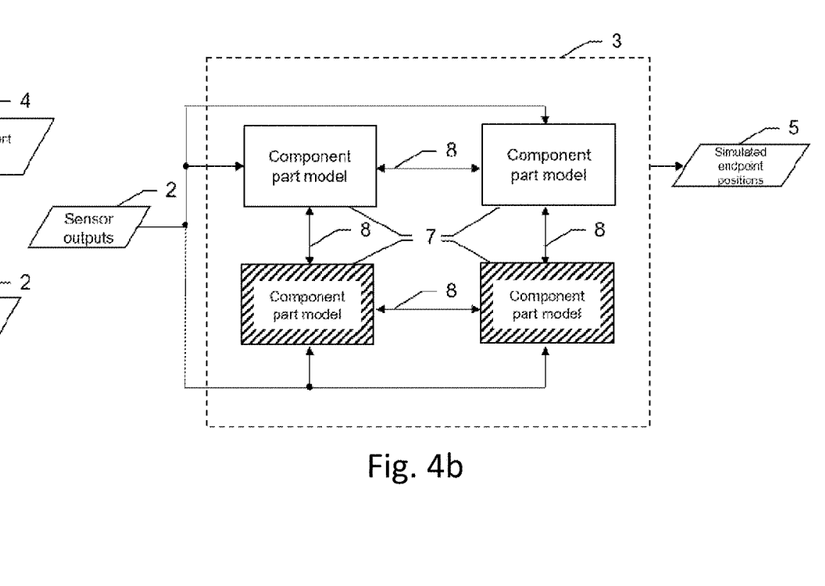

FIG. 4 shows the advantages of the modular structure of the overall CMM model 3. In FIG. 4a, the same configuration of the CMM as in FIG. 2 is shown. Upon a change of the hatched component part in FIG. 4a, certain free parameters of the changed component part would have to be determined through a calibration procedure. In case the CMM were modeled by physically realistic component part models 7, only those free parameters of the component part models 7 corresponding to the changed component part would have to be determined through a calibration procedure. The component parts models 7 which would need to be calibrated are hatched in FIG. 4b. In case the overall measurement process 1 were described through a black-box-model 3, any change in a component part of the CMM would require an extensive recalibration of the black-box-model 3. A modular and physically realistic model 3 of the measurement process 1 allows for a reduction of the number of calibration steps necessary upon the change of a component part of the CMM. The remaining component part models 7 that do not need to be recalibrated can then be automatically adjusted to reflect the different dynamical behavior shown by the CMM during a measurement process 1 after the component part change. If the probe head of the CMM were for example replaced by a probe head with a larger mass, different elastic deformations and vibrations of the overall CMM would be expected. A larger mass of the changed probe head would furthermore increase the gravitational influence upon the entire measurement process 1. The component parts models 7 that do not require recalibration could then be readjusted to take into account such expected changes.

Figure 5:
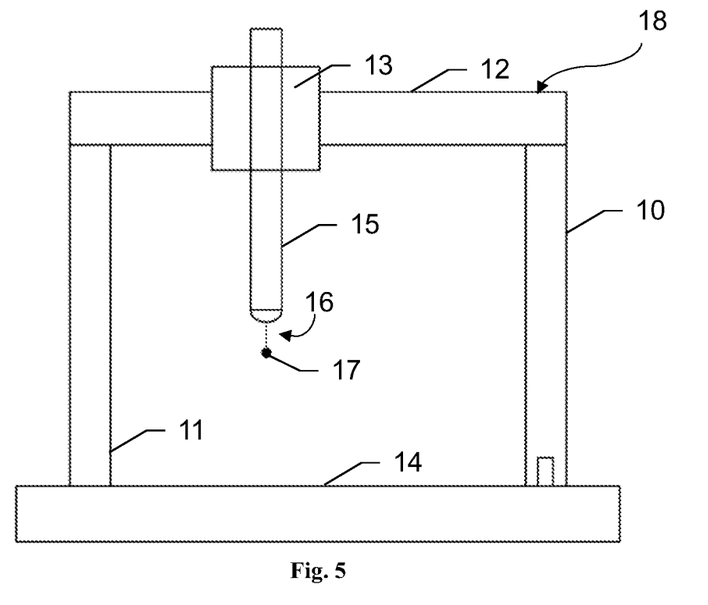
FIG. 5 shows a schematic illustration of an exemplary embodiment of a CMM whose measurement results are to be corrected according to the invention.

FIG. 5 shows a schematic illustration of an exemplary embodiment of a CMM 18 whose measurement results are to be corrected according to the invention. The exemplary CMM comprises a table 14, a left pillar 11, a right pillar 10, an x-beam 12, a carriage 13, a z-ram 15, a probing system 16, and an endpoint 17 of the probing system 16.

Measurements are done using the probing system 16. The probing system 16 may be tactile or optical. It may comprise a probe head, a probe and a stylus, the endpoint 17 of the stylus touching a measurement object. The probe head may also comprise a wrist providing further positioning flexibility to the overall CMM 18. Alternatively, the probe itself may provide for optical measurement capability, so that a stylus would not be necessary. In the latter case, the endpoint of the CMM would correspond to the probe, and a simulation would determine the probe position at a measurement time. The endpoint of a CMM may therefore correspond to the last mechanical sub-component of the probing system 16, wherein the sub-components may be ordered from the z-ram 15 onwards.

Although the invention is illustrated above, partly with reference to some preferred embodiments, it must be understood that numerous modifications and combinations of different features of the embodiments can be made. All of these modifications lie within the scope of the appended claims.

What is claimed is:

1. A non-transitory computer readable medium encoded with a computer program product for numerically correcting an endpoint position of a Coordinate Measuring Machine (CMM) implemented on a computing unit configured to perform a series of operations when the computer program product is executed on the computing unit, the operations comprising:

receiving as input:
  temporally resolved information from a set of sensors attached to or integrated into the CMM,
  temporally resolved information about component parts physically constituting the CMM as well as their mechanical properties,
  a set of possible models, each with a potentially different set of free parameters, for modelling the constituting component parts of the CMM,
  a set of possible models, each with a potentially different set of free parameters, for fusing the constituting component models into a model for the whole CMM, and
  calibration information for adapting the free parameters of the constituting component models and the fusion models from some initially known nominal values of the free parameters,
performing a simulation of the behavior of the CMM, the simulation being based on the temporally resolved information from the sensors attached to the CMM and the temporally resolved information about the component parts physically constituting the CMM as well as their mechanical properties, the simulating including time-adaptive physical modelling of the CMM, such that the models for the constituting component parts of the CMM and the fusion models at a specific simulation time, a corresponding unique physical time existing for each simulation time, are adapted to the temporal history of the sensor readings and the temporal history of the constituting component parts before the uniquely corresponding physical time corresponding to the specific simulation time, wherein for each adaptation of either a constituting component model or a fusion model the provided calibration information is used for adapting the free parameters of the adapted models; and
numerically correcting a measurement obtained by the CMM using the results of the simulation, such that a simulated endpoint position of an endpoint of the CMM at the time at which the measurement was obtained by the CMM is used to numerically correct the measurement, wherein the simulated endpoint position comprises information about the spatial position or orientation of the endpoint of the CMM.

2. The computer program product according to claim 1, wherein the models of the constituent component parts and the fusion models, both adapted in a time-resolved fashion, are selected in such a way as to be able to model expected deformations which the CMM experiences during a measurement process, the measurement process being simulated through the use of said models.

3. The computer program product according to claim 1, wherein the simulation of the CMM proceeds in a two-step fashion, a first step being a multibody simulation, for which it is assumed that the constituting components of the CMM are either rigid bodies or elastic bodies, used for obtaining time-resolved forces and moments acting on the constituting components of the CMM, the calculated time-resolved forces and moments being used in a second step for simulating possible deformations of the constituting components of the CMM.

4. The computer program product according to claim 3, wherein a constituting component of the CMM modelled as an elastic body is either modeled by a set of symbolic equations or by a numerical method, while the chosen resolution of the numerical method and a linked number of node parameters are determined by an expected extent of spatial deformations of the component during a measurement process as well as the expected temporal frequencies of such deformations, so that different constituting components of the CMM are modeled.

5. The computer program product according to claim 1, wherein the simulation of the CMM is carried out using only a subset of the constituting components of the CMM.

6. The computer program product according to claim 1, wherein calibration information is provided in modular form to the computer program product, insofar as separate calibration steps are carried out for subsets of constituting components of the CMM, the separate calibration steps matched in complexity to the number of free parameters parametrizing the overall subset models describing the subsets to be calibrated, and the overall CMM is calibrated by combining these separate calibration steps.

7. Computer program product according to claim 6, wherein upon a change of a constituting component of the CMM, only those subsets comprising the changed constituting component are recalibrated, wherein the free parameters of the remaining subset models are left unchanged.

8. The computer program product according to claim 7, wherein upon a change in a probing system of the CMM, only the sub-structures of the probing system affected by the change are recalibrated, and the models describing the remaining constituting components of the CMM and the fusion models linking the remaining constituting component models are adapted to take into account the known properties of said changed probing system.

9. The computer program product according to claim 1, wherein the computational complexity of the simulation algorithm is given by at most $O(n+m^3)$, with n denoting the number of those constituting components of the CMM which are used in the simulation, and m denoting the greatest number of node points used in the numerical estimation of deformations of the constituting part model of any such constituting component, wherein O corresponds to the asymptotic growth behavior of the computer program product.

10. The computer program product according to claim 1, wherein a change in a constituting component of the CMM is automatically incorporated into the computer program product by equipping each constituting component of the CMM with a unique identifier device so that upon the replacement of a constituting component with a different constituting component the unique identifier of the different constituting component is automatically transmitted to the computer program product which then updates the overall CMM model accordingly.

11. The computer program product according to claim 1, wherein the underlying physical measurement process of the CMM on which the simulation is based provides only one-way information to the computer program product, wherein the results of the simulation are only used for a numerical compensation of CMM measurement errors.

12. The computer program product according to claim 1, wherein the sensor readings used by the computer program product capture information about the state of the CMM.

13. A method for numerically correcting an endpoint position of a CMM, wherein errors between a targeted endpoint position and an actual endpoint position reached during a measurement process are numerically compensated through the use of the computer program product according to claim 1.

14. The method according to claim 13, wherein error compensation values are either computed:
  in real time in parallel to a measurement process of the CMM, or if measurement trajectories are known, before a measurement process of the CMM, such that error compensation maps can be stored on the computing unit for a set of fixed known CMM trajectories, subsequently being used during a measurement process for which error compensation values have been precomputed.

15. The method according to claim 13, wherein:

a calibration step density is bounded from above by at most 4-6, wherein the calibration step density is defined by the ratio of the measurement volume of the CMM in cubic meters to the number of calibration steps performed, wherein a calibration step is considered to be a measurement process which fixes unknown degrees of freedom of the overall CMM model, or from the modular structure of the overall CMM model it follows that the number of calibration steps required depends primarily on the number of degrees of freedom of the constituting component models of the constituting components used in the simulation, wherein a calibration step is considered to be a measurement process applied at specific system states, wherein a system state is described by small position ranges of active axes as well as length and orientation of probe/stylus in the case of a tactile probe.

* * * * *